United States Patent
Martinez et al.

(10) Patent No.: US 11,132,206 B2
(45) Date of Patent: Sep. 28, 2021

(54) SYSTEMS AND METHODS FOR MODIFYING BOOT OPERATION OF AN INFORMATION HANDLING SYSTEM

(71) Applicant: DELL PRODUCTS L.P., Round Rock, TX (US)

(72) Inventors: Ricardo L. Martinez, Leander, TX (US); Richard M. Tonry, Austin, TX (US); Balasingh P. Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 16/402,834

(22) Filed: May 3, 2019

(65) Prior Publication Data

US 2020/0348943 A1 Nov. 5, 2020

(51) Int. Cl.
| | | |
|---|---|---|
| G06F 21/44 | (2013.01) | |
| G06F 21/57 | (2013.01) | |
| G06F 9/4401 | (2018.01) | |
| G06F 9/44 | (2018.01) | |

(52) U.S. Cl.
CPC .......... G06F 9/4401 (2013.01); G06F 21/44 (2013.01); G06F 21/575 (2013.01)

(58) Field of Classification Search
CPC ....... G06F 9/4401; G06F 21/44; G06F 21/575
USPC ................................................. 713/1, 2, 100
See application file for complete search history.

(56) References Cited

U.S. PATENT DOCUMENTS

| | | | |
|---|---|---|---|
| 7,353,376 B2 | 4/2008 | Dennis et al. | |
| 10,055,357 B2 | 8/2018 | Vidyadhara et al. | |
| 2008/0288762 A1* | 11/2008 | Chen ............ | G06F 21/575 713/2 |
| 2010/0058461 A1* | 3/2010 | Wang ............ | G06F 9/4401 726/17 |
| 2013/0007435 A1* | 1/2013 | Bayani .......... | G06F 9/4401 713/2 |

OTHER PUBLICATIONS

Novoa et al., Information Handling System and Methods to Selectively Control Ownership of a Hardware Based Watchdog Timer (WDT), U.S. Appl. No. 16/193,651, filed Nov. 16, 2018, DELL:251, 38 pgs.

* cited by examiner

*Primary Examiner* — Michael J Brown
(74) *Attorney, Agent, or Firm* — Egan, Enders & Huston LLP.

(57) ABSTRACT

Systems and methods are provide that may be implemented to modify boot operation for an information handling system using commands of a script that is detected and authenticated by boot code of the information handling system. The script may include at least one command that modifies a boot operation of the information handling system when performed by the processor. The boot code may be executed by the processor during startup, to detect and authenticate the script, and to process the at least one command after the script is authenticated. Multiple commands may be defined including triggerless actions or trigger actions which are performed in response to a trigger event. A trigger event may be a hardware interaction, such as the pressing of a button.

22 Claims, 6 Drawing Sheets

SYSTEMS AND METHODS FOR MODIFYING BOOT OPERATION OF AN INFORMATION HANDLING SYSTEM

FIELD

This invention relates generally to information handling systems, and more particularly, to booting operations for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer manufacturers provide tools to customers to help them manage and configure their system's boot flow or boot operation (such as one-time boot to a network boot device). These tools are typically menu (wizard) driven methods which enable information technology (IT) professionals to change or configure a one-time boot menu in order to manage and service their computer platforms. Most systems include interfaces and feedback mechanisms, such as a keyboard, a mouse and a display, to provide a way for users to navigate the menus and options. Some platforms, such as typical Internet of Things (IoT) devices, are headless meaning that they have no monitor and keyboard. These platforms require context sensitive actions using volume up/down buttons or a brightness button to drive a one-time boot menu and change one-time boot option. Some all-in-one (AIO) devices are used as a point of sale device with no keyboard. These non-standard interfaces contribute to a lack of consistency encountered when attempting to control and automate the management of user platforms.

Conventional boot operations require the service professional or IT administrator to go through the processes manually to choose desired boot flow, such as a one-time boot flow change. The differences between input mechanisms creates platform and context sensitive controls which depend on the physical buttons (volume up/down) on the systems. Button configuration, including number of buttons, changes on every generation of the systems. This requires modification of the basic input/output system (BIOS) code for customization and increases platform validation complexity and cost. Context sensitive actions to change boot operation are not common across all different computer platforms. As an example, some systems have two buttons whereas other systems may have only one button. This complicates matters by requiring IT administrators and service professionals to refer to the user manual to operate and complete the task. Additionally, headless systems require a temporary monitor and keyboard.

SUMMARY

Disclosed herein are systems and methods that may be implemented to modify boot operation for an information handling system using a script with one or more commands in which the script is detected and authenticated by boot code of the information handling system. In one embodiment, the disclosed systems and methods may be implemented to provide a uniform method that may be implemented in an information technology (IT) ecosystem that includes multiple different types of information handling systems (e.g., including both headless systems and other computer system types that have a monitor and/or keyboard) to configure and control the different information handling system types in a manner that provides a more manageable ecosystem with tools and interfaces.

In one embodiment, an information handling system may be provided that includes at least one processing device and a storage system for storing information, in which the information includes a script and boot code. The script may include at least one command that modifies a boot operation of the information handling system when performed by the processing device. The boot code may be executed by the processing device during startup of the information handling system, in which the boot code detects and authenticates the script and processes the at least one command after the script is authenticated.

In one embodiment, the information handling system may include a network interface, in which the script may be accessed via the network interface. The script may be signed with a secure boot key, in which the boot code authenticates the script by evaluating the secure boot key. The at least one command may include a trigger event and a corresponding trigger action, in which case the boot code arms the information handling system to monitor for corresponding trigger event, and performs when the trigger action when the trigger event is detected. The trigger event may be a hardware interaction detection, such as detection of a button or a switch or any other hardware modification, or software interaction detection such as detection of specific times or dates or ranges thereof, activation or timeout of watchdog timers or the like, password attempt failures, etc. The trigger action may cause a redirected boot operation.

The at least one command may be a triggerless command that is performed immediately when the script is processed. The at least one command may modify a configuration of the information handling system when processed. The script may include a trigger action map further including multiple trigger events, multiple system identifiers and multiple actions, in which at least one action is defined for a corresponding trigger event of a system platform having a corresponding system identifier. At least one system identifier may identify a specific system platform with a specific service tag. The boot code may detect the script based on detecting a state of a configuration flag of a configuration memory.

A method of booting an information handling system according to one embodiment of the disclosed systems and methods includes detecting a script that includes at least one command that modifies a boot operation of the information handling system when performed, authenticating the script, and processing the at least one command during boot after the script is authenticated.

The method may include detecting the script via a network connection. The method may include accessing and evaluating a secure boot key in the script. The method may include arming the information handling system to monitor for a trigger event defined in the at least one command. The method may include performing a corresponding action defined in the at least one command when the trigger event is detected. The method may include arming the information handling system to monitor for a trigger event defined in the at least one command only when a system identifier matches a platform of the information handling system. The method may include redirecting boot operation of the processing device. The method may include modifying a configuration of the information handling system. The method may include performing an action defined by the at least one command only after the at least one command is verified.

In one respect, disclosed herein is an information handling system, including: a programmable integrated circuit; and a storage system coupled to the programmable integrated circuit for storing information. The information may include a script that includes at least one command that modifies boot operation of the information handling system when performed by the programmable integrated circuit, and boot code that is executed by the programmable integrated circuit during startup of the information handling system to detect the script, authenticate the script, and process the at least one command after the script is authenticated.

In another respect, disclosed herein is a method of booting an information handling system, including: detecting a script that includes at least one command that modifies boot operation of the information handling system when performed; authenticating the script; and processing the at least one command during boot after the script is authenticated.

DETAILED DESCRIPTION OF ILLUSTRATIVE EMBODIMENTS

Figure 1:
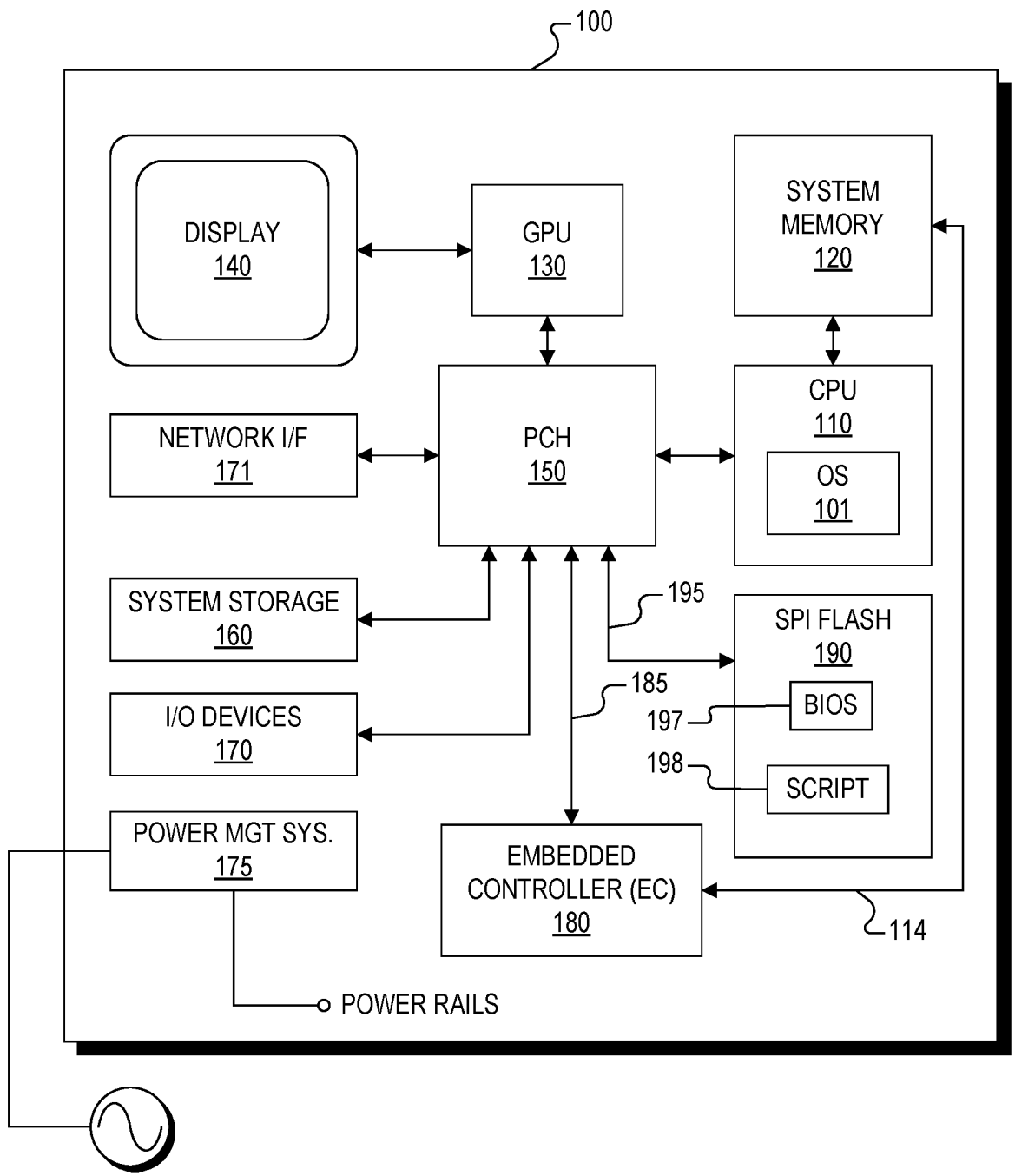
FIG. 1 is a block diagram of an information handling system as it may be configured according to one embodiment of the disclosed systems and methods.

FIG. 1 is a block diagram of an information handling system 100 (e.g., a desktop computer, laptop computer, tablet computer, MP3 player, personal data assistant (PDA), cell phone, etc.) as it may be configured according to one embodiment of the disclosed systems and methods. In this regard, it should be understood that the information handling system 100 is exemplary only, and that the disclosed methods may be implemented on other types of information handling systems. It should be further understood that while certain components of the information handling system 100 are shown for illustrating embodiments of the disclosed systems and methods, the information handling system 100 is not restricted to including only those components shown in FIG. 1 and described below.

The illustrated information handling system 100 includes a host processing device 110 (e.g., programmable integrated circuit such as a central processing unit (CPU)) for executing an operating system (OS) 101 (e.g., Microsoft Windows-based OS such as Windows 10, Linux OS, etc.) for system 100, and for executing software, code, programs, applications, etc. In the one embodiment, the CPU 110 may include any type of processor or processing device, such as an Intel Pentium series processor, an Advanced Micro Devices (AMD) processor or another programmable integrated circuit. The CPU 110 is only one example of a host processing device in which alternative types of programmable integrated circuits are contemplated, such as microcontroller or other types of controllers or microprocessors or the like. In the illustrated embodiment, the CPU 110 may be configured to access non-volatile serial peripheral interface (SPI) Flash memory 190 to load and boot the system BIOS 194 as shown. The CPU 110 is coupled to system memory 120, which may include, for example, random access memory (RAM), dynamic RAM (DRAM), synchronous DRAM (SDRAM). In some embodiments, tasks and functions of SPI Flash 190 described herein may be performed by any other suitable one or more non-volatile memory (NVM) devices, e.g., including solid state drive/s (SSDs), hard drive/s, etc.

In some embodiments, the information handling system 100 may include other types of programmable integrated circuits including, but not limited to, a graphics processor unit (GPU) 130, a graphics-derivative processor (such as a physics/gaming processor), a digital signal processor (DSP), etc. Although GPU 130 is shown as a separate processor in the illustrated embodiment, the GPU 130 may be omitted in other embodiments, when the functionality provided thereby is integrated within CPU 110 in a system-on-chip (SoC) design. The display device 140 (e.g., LCD display or other suitable display device) is coupled to graphics processing unit (GPU) 130 to provide visual images (e.g., a graphical user interface, static images and/or video content) to the user. GPU 130 is, in turn, coupled to CPU 110 via a platform controller hub (PCH) 150.

The PCH 150 controls certain data paths and manages information flow between components of the information handling system 100. As such, the PCH 150 may include one or more integrated controllers or interfaces for controlling the data paths connecting the PCH 150 with the CPU 110, the GPU 130, a system storage 160, input/output (I/O) devices 170, a network interface (I/F) 171, an embedded controller (EC) 180 and the SPI Flash memory device 190 where BIOS firmware image (e.g., BIOS 194) is stored. In one embodiment, PCH 150 may include a Serial Peripheral Interface (SPI) controller and an Enhanced Serial Peripheral Interface (eSPI) controller. In some embodiments, the PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I2C) interface, a Universal Serial Bus (USB) interface and a Thunderbolt™ interface.

The system storage 160, which may include one or more media drives, such as hard disk drives, optical drives, non-volatile RAM (NVRAM), Flash memory, solid state drives (SSDs), or any other suitable form of internal or external storage), is coupled to the PCH 150 to provide permanent storage for information handling system 100. The I/O devices 170 (e.g., a keyboard, mouse, touchpad, touchscreen, etc.) are coupled to PCH 150 to enable the user to interact with information handling system 100, and to interact with application programs or other software/firmware executing thereon. The network I/F 171 enables communication with remote devices and servers or the like via external networks (not shown).

A power source for the information handling system 100 may be provided via an external power source (e.g., mains power) and an internal power supply regulator, and/or by an internal power source, such as a battery. In the illustrated embodiment, a power management system 175 may be included within information handling system 100 for moderating the available power from the power source. In one embodiment, the power management system 175 may be coupled to provide operating voltages on one or more power rails to one or more components of the information handling system 100, as well as to perform other power-related administrative tasks of the information handling system. For example, the power management system 175 may be coupled to provide an operating voltage on a primary power rail to the PCH 150, and may be further coupled to provide an operating voltage (e.g., 3.3V) on another power rail to the EC 180. In addition to the power rails explicitly shown, it is noted that power management system 175 may be coupled to provide additional operating voltages on one or more additional power rails to the PCH 150, the EC 180 and other components of information handling system 100.

The EC 180 is coupled to the PCH 150 and may be configured to perform functions such as power/thermal system management, etc. The EC 180 may also be configured to execute program instructions to boot the information handling system 100, load application firmware from the SPI Flash memory device 190 into internal memory, launch the application firmware, etc. In one example, the EC 180 may include a programmable integrated circuit for executing program instructions to perform the above stated functions. Although not strictly limited to such, EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, the EC 180 is coupled to the PCH 150 via a data bus 185, and the SPI Flash memory device 190 is coupled to the PCH 150 via a data bus 195. According to one embodiment, the data bus 195 is a Serial Peripheral Interface (SPI) bus, and the data bus 185 is an Enhanced Serial Peripheral Interface (eSPI) bus. In the embodiment shown in FIG. 1, SPI Flash memory device 190 is a shared Flash memory device, which is connected to the PCH 150 and the EC 180. In such configuration, the PCH 150 provides the EC 180 shared access to the SPI Flash memory device 190 via the eSPI bus 185, the SPI bus 195 and various interface and logic blocks included within the PCH 150.

In the illustrated embodiment, a script 198 is shown stored on the SPI Flash memory device 190. The script 198 includes a list of one or more commands capable of being 'executed' or otherwise performed on the information handling system 100 without being compiled. In one embodiment, the script 198 is not an executable module, but instead has commands that modify the behavior and boot operation of the platform via the BIOS firmware when performed by the CPU 110. As further described herein, the startup code or firmware in the BIOS 197 includes detection code or any other mechanism for detecting the presence of and authenticating the script 198, and incorporates a firmware module that is used to interpret and perform the commands of the script 198. In one embodiment, the script 198 is signed with a secure boot database (dB) key or the like, and the BIOS firmware uses the dB key to authenticate the script 198 before being executed.

When the script 198 is processed, the script commands may be used to perform actions used to configure and/or manage the information handling system 100. These actions may include changes to boot operation which may including configuration changes for one-time boot flow. In addition, or in the alternative, these actions may be customized actions that are based on system state, system configuration, or other inputs and actions to control boot operation. The BIOS firmware reads the script 198 during the pre-boot process based on a customized trigger input or trigger event, by a special hot key, or based on the detection/presence of the script 198. Multi-step operations can be automated in the script 198. The actions may be triggerless, such as being accomplished without any conditions, or the actions may be trigger actions based on some predetermined trigger event. Examples of trigger events include, but are not limited to, a specified time, a specified date, an alarm condition, a watchdog timer, chassis intrusion, peripheral insertion/removal, internal or external media insertion or removal, network connectivity, the pressing of a button on a keyboard or other hardware device, etc.

In one embodiment, these actions facilitate the boot process of the information handling system 100 to be configured immediately, or based on environmental, or platform configuration changes. Authentication, such as unified extensible firmware interface (UEFI) Secure Boot signature verification or the like, allows customers to customize and provision their platform. This creates an efficient and secure method for creating and managing their own platforms based on their specific needs.

The information handling system 100 of FIG. 1 is an example of a somewhat sophisticated information handling system platform, yet applicable embodiments may include more complex configuration platforms as well as less sophisticated processing platforms, such as headless devices without a monitor or keyboard including rack-mounted servers or the like, all-in-one (AIO) devices such as printers and the like, Internet of Things (IoT) devices such as home appliances and the like, etc. The information handling system 100 is intended to represent a variety of different system or hardware platforms.

Figure 2:
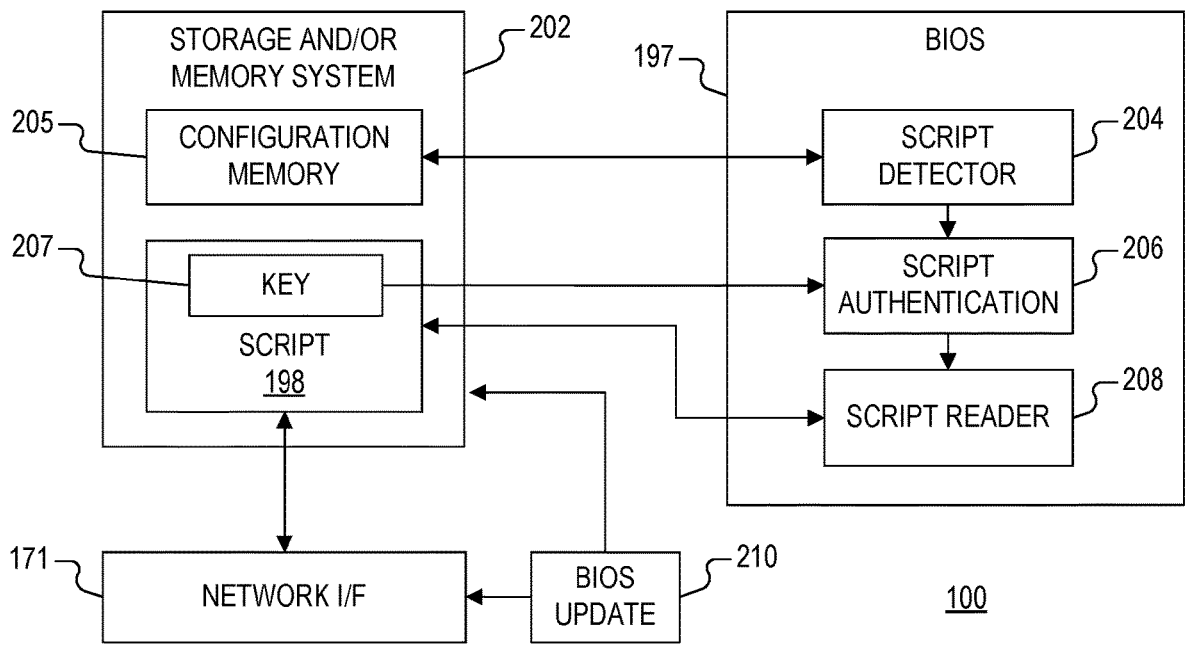
FIG. 2 is a simplified block diagram of a portion of the information handling system of FIG. 1 illustrating further details of detection, authentication, and interpretation of the script according to one embodiment of the disclosed systems and methods.

FIG. 2 is a simplified block diagram of a portion of the information handling system 100 illustrating further details of detection, authentication, and processing of the script 198 according to one exemplary embodiment of the disclosed systems and methods. In the illustrated embodiment, a storage and/or memory system 202 represents a combination of memory and storage devices, such as, for example, a combination of the system memory 120, the SPI Flash 190, and any storage device of the system storage 160, etc. Although the script 198 is shown stored in the SPI Flash 190 of the information handling system 100 shown in FIG. 1, the script 198 may alternatively be stored on a hard drive or NVRAM of the system storage 160, any other storage or memory device of the system 100, or even loaded into the system memory 120 during operation. The script 198 may be authorized before the platform of system 100 allows script 198 to be injected (i.e., meaning the script 198 is securely stored to memory such as NVRAM or any other storage device) from a network device or server coupled via the network I/F 171, or may even be accessed via the network I/F 117 without being downloaded to the information handling system 100. In one embodiment, an external tool may be used to inject script 198, which may be downloaded to system 100 from a network device or server and stored locally on system 100. It is also possible that injection of script 198 may occur locally via a storage device (e.g., USB Key) on the platform.

The BIOS 197 includes the startup code or firmware loaded into and executed by the CPU 110 at startup of the information handling system 100. BIOS 197 may include code that is executed to specifically parse an injected script-containing packet and perform various actions such as script detection, authentication, reading, interpretation and performance of script commands. For example, BIOS 197 may include script detector code 204 or the like that detects the presence (and possibly location of) the script 198, e.g., in a predefined area such as specific file from the firmware volume or hard drive location. As an example, the storage and/or memory system 202 may include a configuration memory 205, such as a configuration register or the like, including one or more bits that are set by a user to indicate the presence of the script 198. The BIOS 197 may further include script authentication code 206 or the like used to authentic the script 198. For example, the script 198 may include a secure boot key 207 or the like that is accessed by the script authentication code 206 to verify the authenticity of the script 198 by authentication of script 198 (signature verification passes). If the script 198 is not authenticated, it may simply be ignored, although an error or warning message may also be indicated or displayed (e.g., on display 140) if desired. The BIOS 197 may further include script reader code 208 or the like that is used to read, interpret and perform the commands of the authenticated script 198 as further described herein. Script interpreter code may be code-specific, and examples of suitable script interpreter code include, but are not limited to, JavaScript Object Notation (JSON) script, Extensible Markup Language (XML) script, etc.

One particular advantage of an embodiment of the disclosed systems and methods is that the BIOS 197 may generally remain unmodified in which the script 198 is used to modify or update the boot processor system configuration or the like. It may be desired from time to time, however, to update detection mechanisms, to update authentication methods, and/or to update script commands or command types. As shown, a BIOS update 210 may be injected from the network or stored directly into the storage and/or memory system 202 and used to update the BIOS 197 to update any one or more of the script detector code 204, the script authentication code 206, and/or the script reader code 208.

Figure 3:
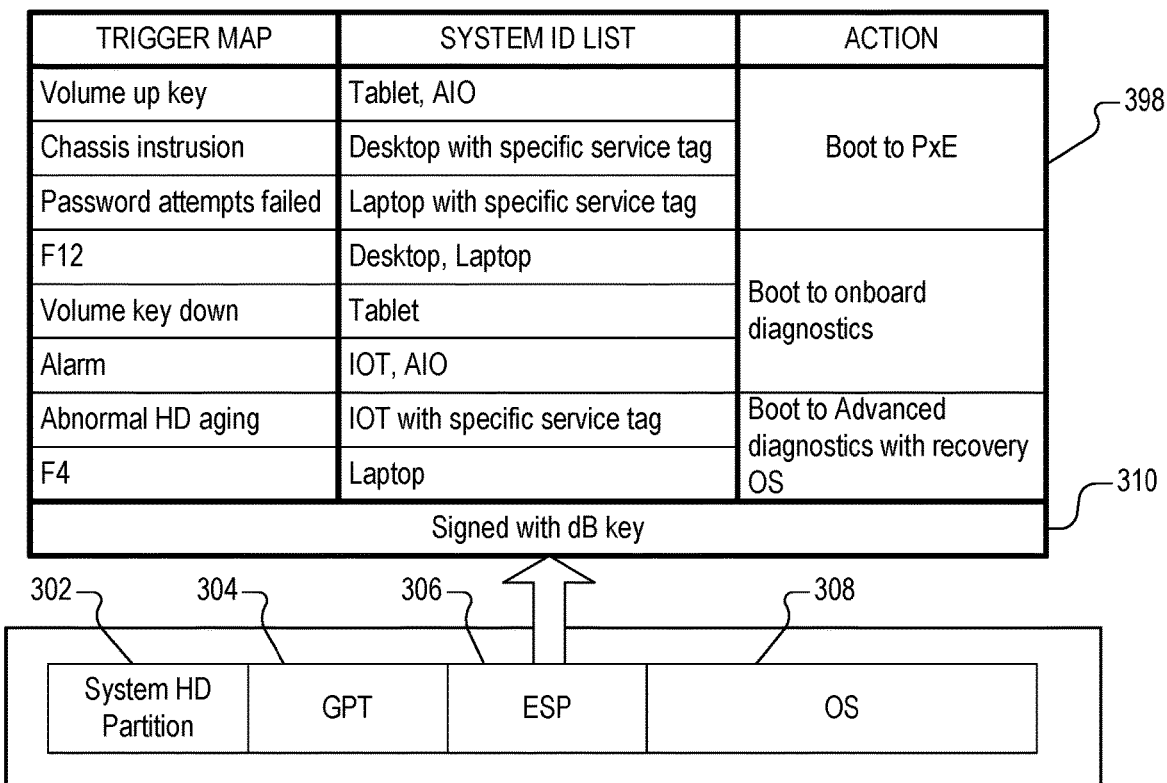
FIG. 3 is a figurative block diagram of a portion of the information handling system of FIG. 1 for processing a trigger action map that is operative to change boot operation of the information handling system.

FIG. 3 is a figurative block diagram of a portion of the information handling system 100 for generating and processing a trigger action map 398 that is operative to change boot operation of the information handling system 100 according to one exemplary embodiment. The trigger action map 398 is a specific example of the script 198 configured to define a set of trigger-based actions for different platforms to perform different actions depending upon the particular platform and corresponding trigger events. In this embodiment, the information handling system 100 includes a hard drive (or a solid state drive or the like), such as provided in the system storage 160, which further includes a system hard drive partition 302. The system hard drive partition 302 further includes a globally unique identifier (GUID) Partition Table (GPT) 304 which provides a standard for the layout of partition tables of the physical hard drive. During the boot process prior to loading the Operation System (OS) 308, an Extensible Firmware Interface (EFI) System Partition (ESP) firmware 306, such as configured according to the Unified EFI (UEFI) or the like (as part of the BIOS firmware), reads the trigger action map 398 based on a customized trigger event, a special hot key, or the detection of the presence of the script 198 in the form of the trigger action map 398. In this case the trigger action map 398 is signed with an authorized database (dB) key 310.

In the embodiment of FIG. 3, the BIOS firmware, shown as part of the ESP firmware 306, first authenticates the trigger action map 398 by evaluating the dB key 310. If authenticated, the BIOS firmware takes the commands from the trigger action map 398 and applies the actions onto the platform for the BIOS to interpret and process. In general, a script 198 may include any combination of trigger actions (trigger-based) or triggerless actions. Triggerless actions may be executed or otherwise performed immediately without further input or conditions. Trigger actions, on the other hand, are conditional actions that are performed in response to on one or more conditions. The trigger action map 398 is an example of a set of trigger actions that may be the entire script 198 or a portion thereof.

In this embodiment, the trigger action map 398 includes a list of trigger events, a system identifier (ID) list, and a corresponding trigger action in response to each trigger event for a given system configuration as identified by the system ID list. Each trigger event indicates the occurrence of any one of several different types of trigger inputs, such as pressing of a specified hardware button (e.g., volume up/down key, function key, etc.), activation of a security device (e.g., chassis intrusion detection), activation of an alarm (e.g., watchdog timer expiration to take some action such as shutdown or boot to special OS when the timer expires), occurrence of a monitored event (e.g., password attempts, hard drive aging, etc.), etc. The system ID list is a method of classifying the information handling system 100 according to a platform type, such as a tablet device, an AIO device, a desktop computer, a laptop computer, an IoT device, etc. The system ID list may further be used to classify each platform based on a specific service tag, such as those devices provided to a specific customer or customer type, or those devices having a higher level of security. The illustrated trigger action map 398 provides various methods of booting or redirection of boot operation based on platform type, such as booting to a pre-boot execution environment (PxE), booting to onboard diagnostics, booting to advanced diagnostics with recovery operating system, etc.

As shown in FIG. 3, for example, the trigger action map 398 commands that the platform boot to PxE if the volume up key platform is pressed for a tablet or AIO device, or in the event of chassis intrusion for a desktop computer having specified service tag, or in the event that a number of password failure attempts has reached an indicated threshold for a laptop computer having specified service tag. Also, the trigger action map 398 commands that the platform boot to onboard diagnostics if the F12 function key is pressed for a desktop or laptop computer, or if the volume key down button of a tablet device is pressed, or in the event of an alarm (e.g., watchdog timer expiration) for an IoT or AIO device. In addition, the trigger action map 398 commands that the platform boot to advanced diagnostics with recover OS in the event abnormal hard drive aging is detected for an IoT device with a specific service tag, or if the F4 function key is pressed for a laptop computer.

The illustrated trigger action map 398 is exemplary only and many different types of trigger actions and corresponding trigger events may be defined for any number of different platforms. In general, trigger events may be based on hardware detection interaction, such as pressing of a button (e.g., volume key, function key, simultaneous key combinations, etc.), peripheral insertion or removal, internal or external media insertion or removal, chassis intrusion, etc., or may be based on software interaction detection, such as alarm events, detection of specific times or dates or ranges thereof, activation or timeout of watchdog timers or the like, password attempt failures, etc., or combinations thereof, such as hard drive aging, detection of network connectivity, etc. In some embodiments, it will be understood that an information handling system 100 may include any type of sensor (e.g., accelerometer, limit switch, etc.) that is suitable for detecting chassis intrusion, peripheral or media insertion or removal. Such a sensor may be coupled to (or otherwise be in signal communication) with EC 180 and/or CPU 110 to provide a signal to EC 180 and/or CPU 110 that is indicative of a chassis intrusion or peripheral or media insertion or removal action.

It is noted that the trigger action map 398 illustrated in FIG. 3 is shown in a tabular format for readability, but that an actual script may include a set of conditional commands or the like. For example, a single command may be specified to boot to PxE if a chassis intrusion is detected for a desktop computer having specified service tag (specific service tag number or range of numbers). In one embodiment, system ID may be optionally specified as a further requirement for command execution, e.g., when the injected packet is targeted for a specific make and model of information handling system (i.e., via the System ID). In such an optional embodiment, when the specified system ID of a given command matches the system ID of the particular platform, then the platform is armed to monitor the trigger event corresponding to the given command as further described herein. Otherwise if the specified system ID of a given command does not match the system ID of the particular platform, then the given command is simply ignored for that platform.

Figure 4:
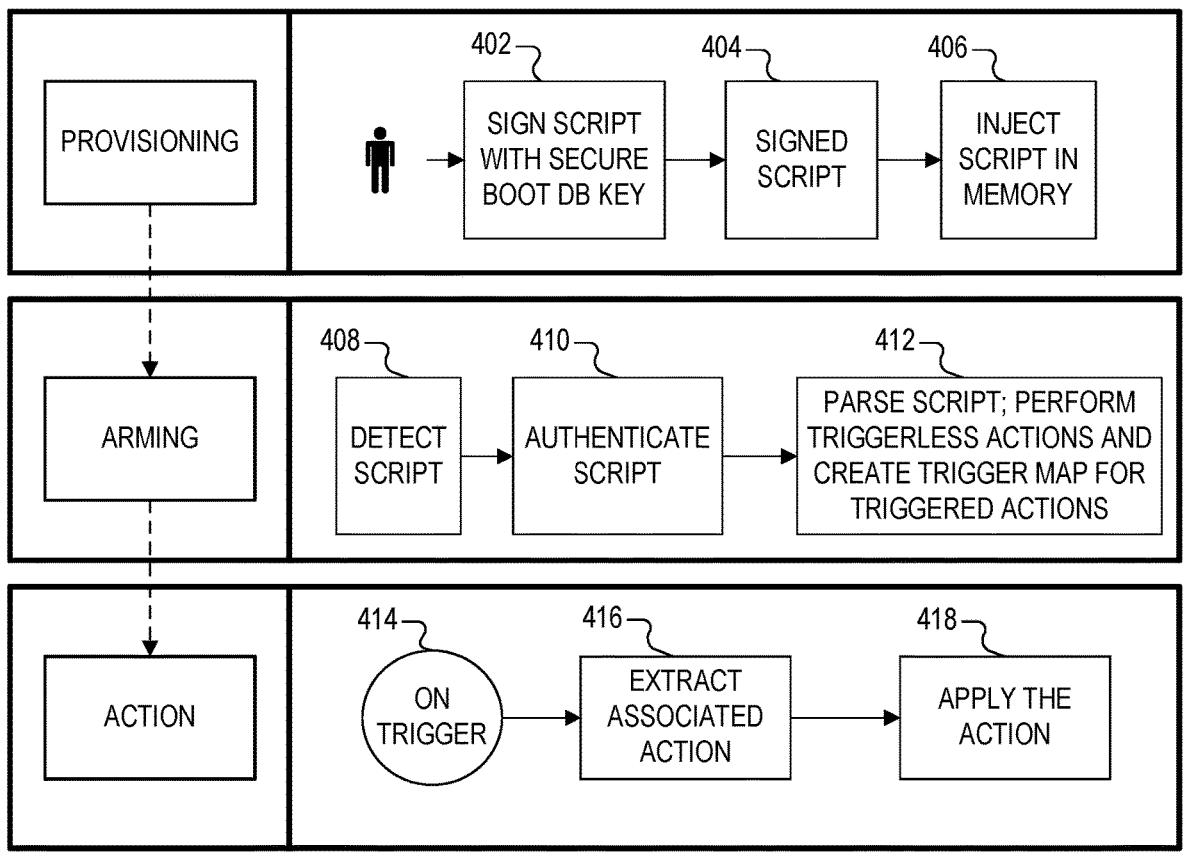
FIG. 4 is a simplified block diagram illustrating provisioning, arming, and action phases according to one embodiment of the disclosed systems and methods.

FIG. 4 is a simplified block diagram illustrating provisioning a script (such as the script 198) onto a platform (such as the information handling system 100), arming the platform with the provisioned script, and taking action in response to detection of a monitored trigger event according to one embodiment of the disclosed systems and methods. A user of the platform first generates a script for a particular system or platform or for a group or set of platforms or information handling systems. The script may be generated according to manufacturer's BIOS command guidelines. The script is not an executable module but instead includes commands that modify the behavior or boot operation of the platform via the BIOS. The user may then sign the script with a secure boot dB key as shown at 402 resulting in a signed script shown at 404, and then the signed script is injected into the memory (or storage) of the platform model as shown at 406. The secure boot dB key may be, for example, provided by the manufacturer or generated by a customer using pre-provisioned boot dB keys or the like. The dB keys may be associated with the secure Boot Key Exchange Key (KEK) on the platform. The script may be injected either locally or remotely, e.g., such as delivered from a local memory device or a storage device (such as NVRAM or a hard drive or the like) or delivered from a network connection, such as via the network I/F 171. Provisioning may also include activating a detection mechanism, such as setting a bit in the configuration memory 205 or the like.

The arming phase beings during the boot process. When executed, the BIOS code detects the script as shown at 408, authenticates the script as shown at 410, such as by using the secure boot key or the like, and then the script is parsed to perform any immediate actions and/or to create a trigger action map as shown at 412. As previously described with reference to FIG. 2, the BIOS 197 may include script detector code 204 or the like that detects the presence (and possibly location of) the script 198, may include script authentication code 206 to authenticate the script, and may include script reader code 208 or the like reads, interprets and performs the commands of the script 198. Triggerless commands may be performed immediately without delay. The script reader code 208 arms the system for any actions based on a trigger event in accordance with a trigger map or the like, such as shown in FIG. 3.

The action phase begins in response to a trigger event as shown at 414 for trigger-based or trigger commands, in which the associated action is extracted as shown at 416 and then applied to the system as shown at 418. The action phase may incorporate any number of trigger actions as well as any number of triggerless actions.

Figure 5:
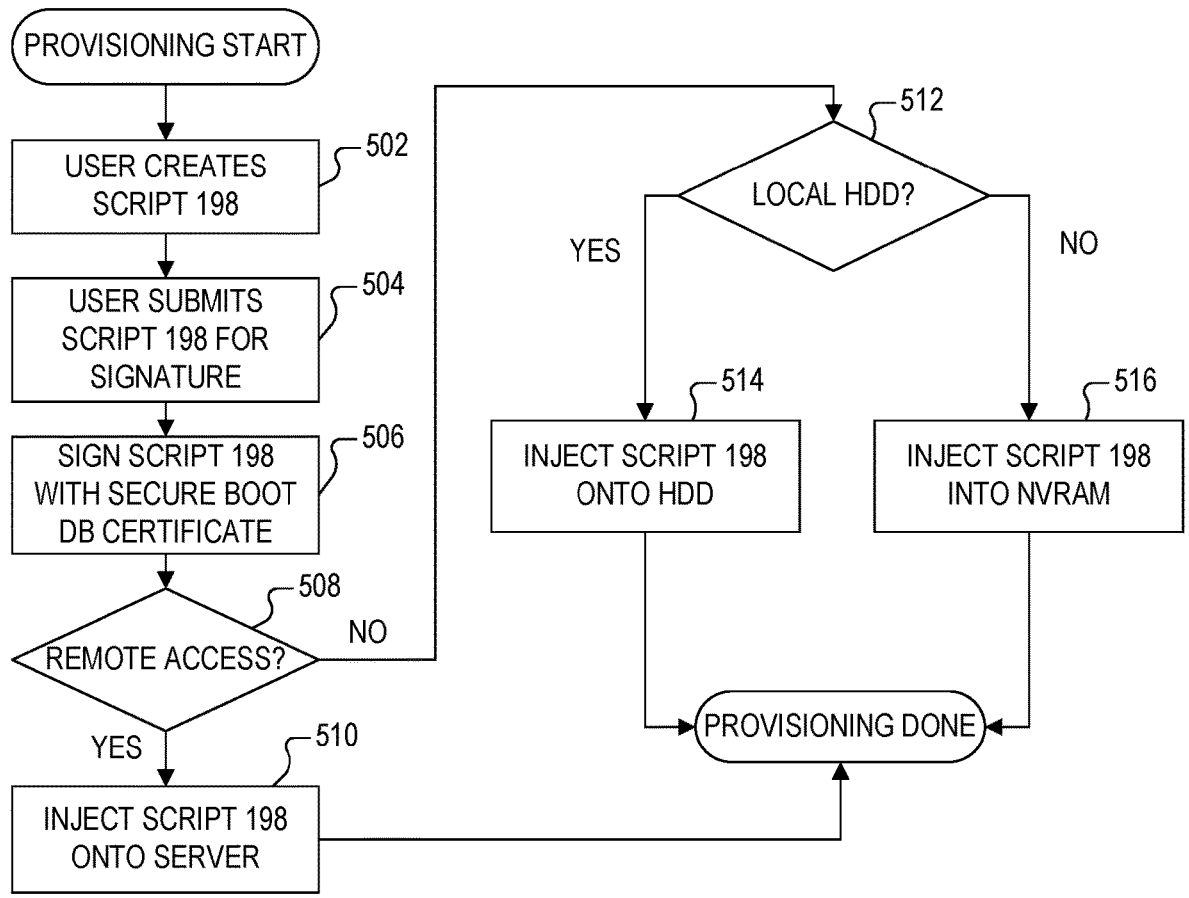
FIG. 5 is a flowchart diagram illustrating the provisioning phase in more detail according to one embodiment of the disclosed systems and methods.

FIG. 5 is a flowchart diagram illustrating the provisioning phase in more detail according to one embodiment of the disclosed systems and methods. The user creates the script 198 at block 502, submits the script for signature at next block 504, and the script is then signed with a secure boot dB certificate at block 506 (the script 198 is signed with a private key pair before the injection). Operation then advances to query block 508 to determine whether the script 198 is accessed locally or remotely. If remotely stored, operation advances to block 510 in which the script 198 is injected onto a remote server or the like accessible via the network I/F 171, and provisioning is complete. If locally stored, such as in the system storage 160, operation advances instead to query block 512 to determine the local location of the script. If stored on a local hard drive, then operation advances to block 514 in which the script 198 is injected onto the hard drive ("HDD" or "HD"), such as the ESP partition of the hard drive (or the ESP firmware 308). If stored in NVRAM, then operation advances instead from block 512 to block 516 in which the script 198 is injected into NVRAM and provisioning is complete. It will be understood that alternative locations are contemplated, such as the system memory 120 or the SPI Flash memory 190.

Figure 6:
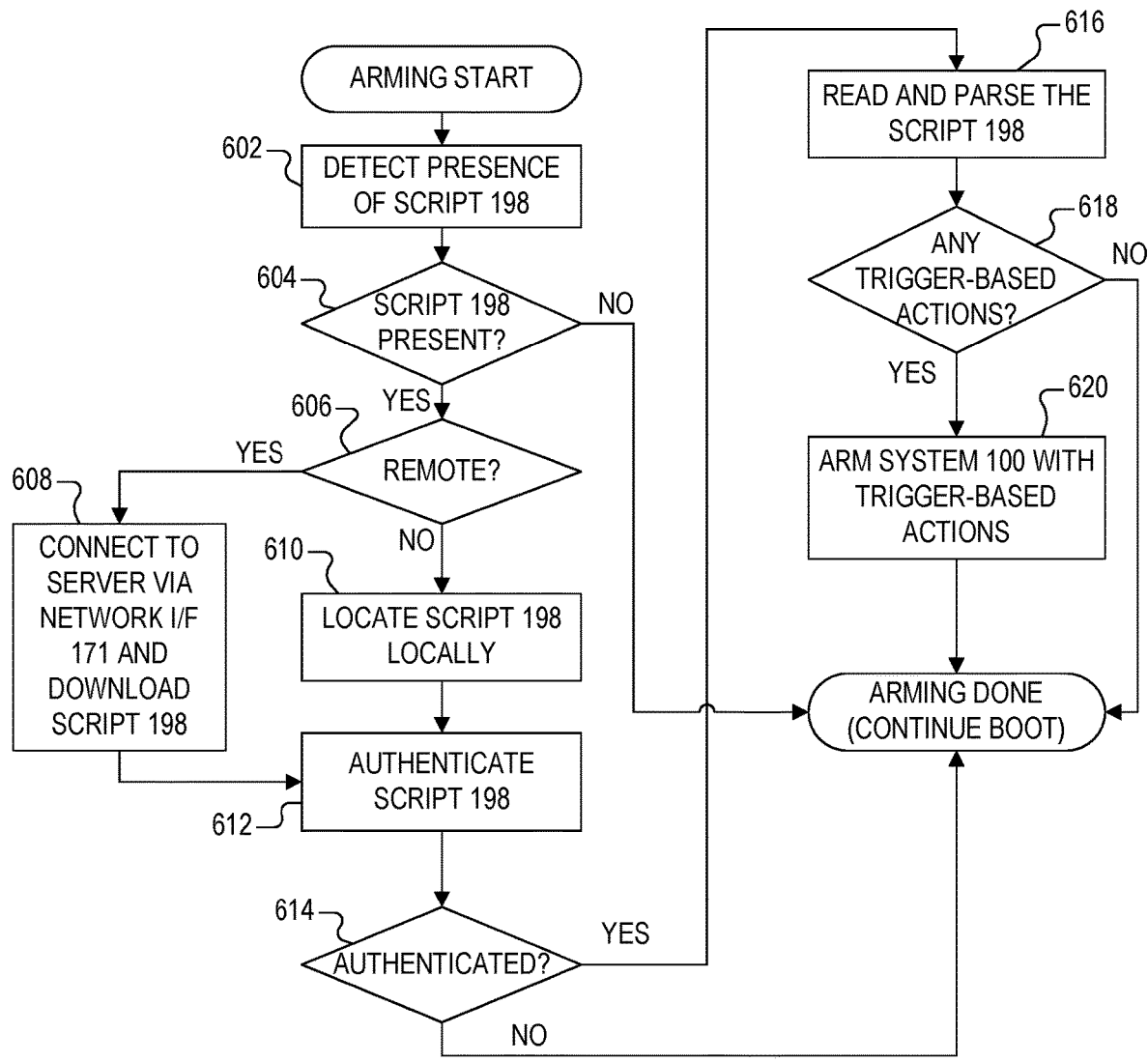
FIG. 6 is a flowchart diagram illustrating the arming phase in more detail according to one embodiment of the disclosed systems and methods.

FIG. 6 is a flowchart diagram illustrating the arming phase in more detail according to one embodiment of the disclosed systems and methods. As the information handling system 100 begins the booting process, operation advances to block 602 in which the system 100 detects the presence of the script 198, such as, for example, by operation of the script detector code 204. At next query block 604, it is queried whether the script 198 is present. If the script 198 is not detected, then the arming phase is completed and the boot process continues. If the script 198 is detected, then operation advances instead to block 606 to query whether the script 198 is remotely located. If the script 198 is remotely located, then operation advances to block 608 in which the system 100 is connected to a remote server via the network I/F 171 and the script 198 is download to a local location, such as, for example, to the SPI Flash memory 190. If the script 198 is not remotely located as determined at block 606, then operation instead advances to block 610 in which the script 198 is located locally within the system 100.

After completion of either block 608 or 610 in which the script 198 is located and accessed, operation advances to block 612 in which the script 198 is authenticated using the secure boot db certificate, e.g., by comparing a boot key within the script 198 (which was signed with a private key pair before its injection) against the secure boot dB certificate of the system 100. At next block 614 it is queried whether the script 198 is authenticated based on the verification of block 612. If the script 198 is not authenticated, then it may be ignored and the arming phase is completed so that the boot process continues. If the script 198 is authenticated, then operation proceeds instead to block 616 in which the provided script 198 is read and parsed. During the parsing process, operation proceeds to block 618 to determine whether any trigger actions are provided within the script 198. If not, then the arming phase is completed and the boot process continues according to the BIOS code. Otherwise, if there are trigger actions in the script 198, then operation proceeds to block 620 in which the system 100 is armed to perform the actions in response to the corresponding trigger events, and the arming phase is completed so that the boot process continues.

Figure 7:
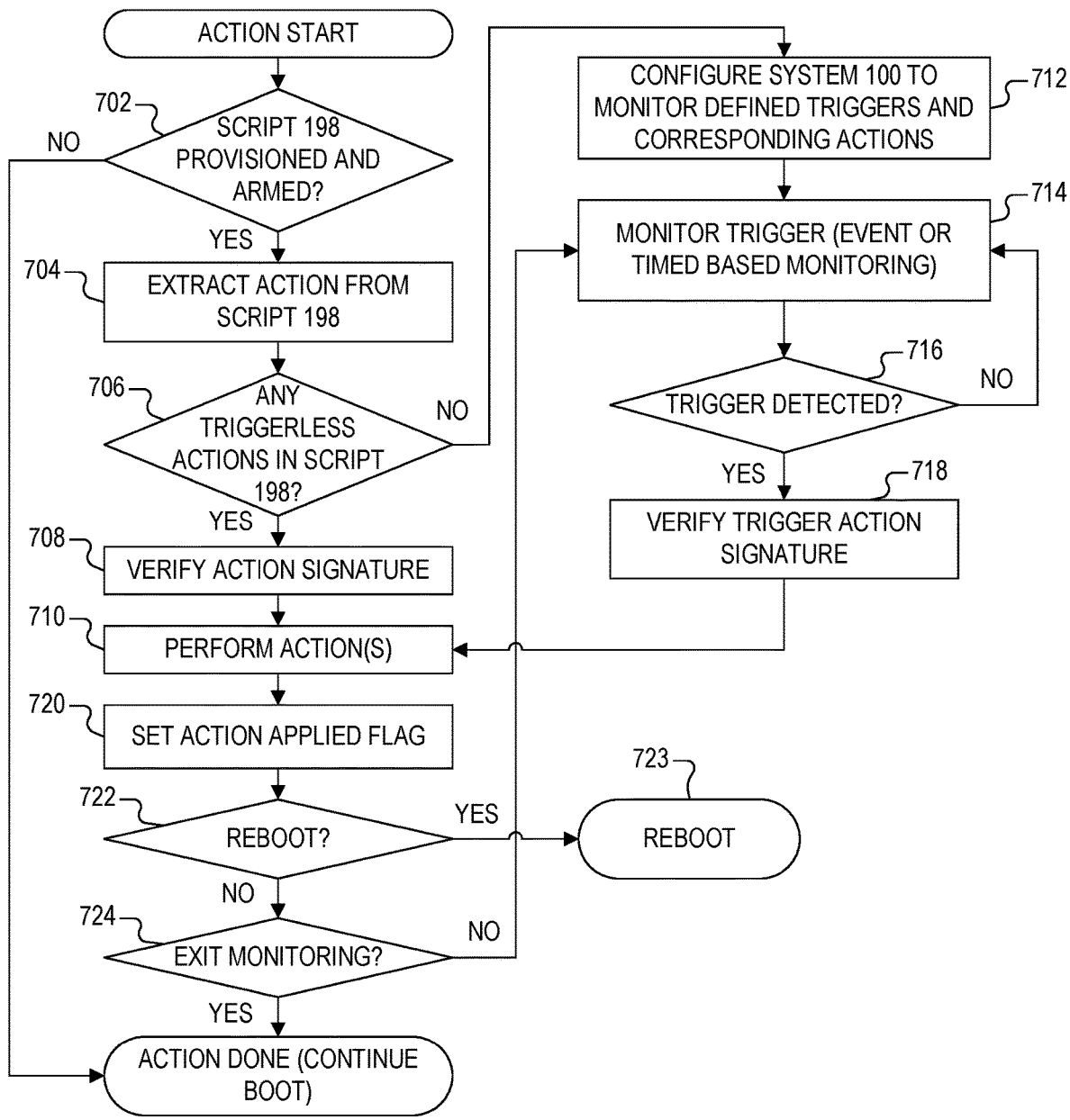
FIG. 7 is a flowchart diagram illustrating the action phase in more detail according to one embodiment of the disclosed systems and methods.

FIG. 7 is a flowchart diagram illustrating the action phase in more detail according to one embodiment of the disclosed systems and methods. At first block 702 it is queried whether the script 198 is provisioned and armed. If not, then the action phase is completed and the boot process continues. If the script 198 is provisioned and armed, then operation proceeds to block 704 in which the actions are extracted from the script 198. At next block 706, it is queried whether the script 198 includes any triggerless actions, meaning those actions that are to be performed immediately. If so, then operation may proceed to block 708 in which individual actions may be optionally verified. In this case, although the entire script 198 has been authenticated, it may be desired to optionally further verify (or authenticate) each of the individual actions in the script 198 before being performed. In such an optional embodiment, each individual action may be optionally signed (in addition to the entire script 198) to add an extra level of security and/or to provide authentication for the specific individual actions (individual command verification). In one embodiment, each individual action may be signed with the same key as the entire script 198 and/or the other individual actions. Alternatively, each individual action may be signed with a different and separate key from the script 198 (and optionally different from all other individual actions) to provide additional security for individual command verification.

After the triggerless actions are verified, operation proceeds to bock 710 in which the verified triggerless actions are performed. In this embodiment, if one or more triggerless actions are not verified, then they are ignored and not performed. In an alternative embodiment in which individual triggerless actions are not verified once the entire script 198 is authorized, block 708 is omitted or otherwise bypassed in which operation proceeds directly to block 710 from block 706 to perform the triggerless actions.

If there are no triggerless actions as determined at block 706, then operation proceeds instead to block 712 in which the system 100 is configured to monitor the defined triggers and to perform the corresponding actions when the triggers are detected. Once configured, operation proceeds to block 714 in which the defined triggers are monitored. A query block 716 represents detection of any of the defined triggers, in which operation loops between blocks 714 and 716 for each monitored trigger. When a trigger is detected, operation may advance directly to block 710 to perform the corresponding action. In an alternative embodiment individual trigger actions may be verified similar to that described in block 708 for the triggerless actions, e.g., when a trigger is detected in block 716, operation advances instead to optional block 718 to first verify the corresponding action before being performed in block 710. If verification of the action is defined and it is not verified in block 718, then the action is ignored and not performed.

Once one or more actions are performed at block 710, operation proceeds to block 720 in which an "action applied" flag is set for each action that was performed. Once one or more flags for completed actions are set, operation advances to block 722 to inquire whether an action requires that the system 100 be rebooted. If so, then the current boot process is terminated and the system 100 is rebooted. It is noted that for some actions, the script 198 may be retained across multiple boot sessions by keeping within the ESP 306 or the SPI Flash memory 190 or the like. Some operations may need multiple boots or some triggerless or trigger actions may be persistent between boots.

If the system 100 is not to be rebooted as determined at block 722, then operation proceeds instead to block 724 to query whether or not to exit monitoring. If monitoring is to be continued, then operation loops back to block 714 to continue monitoring for trigger events. If monitoring is to be terminated, then the action phase is completed and the current boot process is continued.

In an alternative embodiment, the system 100 may first be configured to monitor trigger events before any triggerless actions are performed. Also, the boot process may continue including performing triggerless events while the trigger events are being monitored. In one embodiment, for example, one or more triggers may be set up as interrupts so that the boot process may proceed, including performing triggerless events, until an interrupt occurs. Alternatively, once the system 100 is configured for monitoring, the monitored trigger events may be checked on a periodic basis while the boot process continues.

The system policy may be associated with the application of the secure boot signed script. For example, the script may be persistent in which it is always run on every boot. Alternatively, the script may be performed as a one-time operation in which it is run once and deleted. In addition, operation of the script may be conditional, such as being run until a condition is met or a sequence of conditions are met, or only being run after a condition is met or sequence of conditions are met.

It will be understood that the steps of shown and described herein are exemplary only, and that any combination of fewer, additional and/or alternative steps may be employed that are suitable for modifying startup or boot operation or boot flow of an information handling system.

It will also be understood that one or more of the tasks, functions, or methodologies described herein (e.g., including those described herein for components 110, 120, 130, 150, 160, 180, 190, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   a programmable integrated circuit; and
   a storage system coupled to the programmable integrated circuit for storing information, wherein the information includes:
      a script comprising at least one command that modifies boot operation of the information handling system when performed by the programmable integrated circuit; and
      basic input/output system (BIOS) code that is executed by the programmable integrated circuit during startup of the information handling system, wherein the BIOS code detects the script, authenticates the script, and processes the at least one command after the script is authenticated.

2. The information handling system of claim 1, further comprising a network interface, wherein the script is accessed via the network interface.

3. The information handling system of claim 1, wherein the script is signed with a secure boot key, and wherein the BIOS code authenticates the script by evaluating the secure boot key.

4. The information handling system of claim 1, wherein the at least one command comprises a triggerless command that is performed immediately when the script is processed.

5. The information handling system of claim 1, wherein the at least one command modifies a configuration of the information handling system when processed.

6. The information handling system of claim 1, where the script and the BIOS code are stored together on the same serial peripheral interface (SPI) Flash memory device.

7. An information handling system, comprising:
   a programmable integrated circuit; and
   a storage system coupled to the programmable integrated circuit for storing information, wherein the information includes:
      a script comprising at least one command that modifies boot operation of the information handling system when performed by the programmable integrated circuit; and
      boot code that is executed by the programmable integrated circuit during startup of the information handling system, wherein the boot code detects the script, authenticates the script, and processes the at least one command after the script is authenticated;
      wherein the at least one command comprises a trigger event and a corresponding trigger action, wherein the boot code arms the information handling system to monitor for the corresponding trigger event, and wherein the trigger action is performed when the trigger event is detected.

8. The information handling system of claim 7, wherein the trigger event comprises at least one of hardware interaction detection and software interaction detection.

9. The information handling system of claim 7, wherein the trigger action comprises a redirected boot operation.

10. An information handling system, comprising:
    a programmable integrated circuit; and
    a storage system coupled to the programmable integrated circuit for storing information, wherein the information includes:

a script comprising at least one command that modifies boot operation of the information handling system when performed by the programmable integrated circuit; and boot code that is executed by the programmable integrated circuit during startup of the information handling system, wherein the boot code detects the script, authenticates the script, and processes the at least one command after the script is authenticated;

wherein the script comprises a trigger action map including a plurality of a trigger events, a plurality of system identifiers and a plurality of actions, and wherein at least one of the plurality of actions is defined for a corresponding trigger event of a system platform having a corresponding system identifier.

11. The information handling system of claim 10, wherein at least one of the plurality of system identifiers identifies a specific system platform with a specific service tag.

12. An information handling system, comprising:
a programmable integrated circuit; and
a storage system coupled to the programmable integrated circuit for storing information, wherein the information includes:
   a script comprising at least one command that modifies boot operation of the information handling system when performed by the programmable integrated circuit; and
   boot code that is executed by the programmable integrated circuit during startup of the information handling system, wherein the boot code detects the script, authenticates the script, and processes the at least one command after the script is authenticated;
   wherein the boot code detects the script based on detecting a state of a configuration flag of a configuration memory.

13. A method of booting an information handling system, comprising executing basic input/output system (BIOS) code on a programmable integrated circuit to perform:
   detecting a script that comprises at least one command that modifies boot operation of the information handling system when performed;
   authenticating the script; and
   processing the at least one command during boot after the script is authenticated.

14. The method of claim 13, wherein the detecting a script comprises detecting the script via a network connection.

15. The method of claim 13, wherein the authenticating the script comprises accessing and evaluating a secure boot key in the script.

16. The method of claim 13, wherein the processing the at least one command comprises redirecting boot operation of the processing device.

17. The method of claim 13, wherein the processing the at least one command comprises modifying a configuration of the information handling system.

18. The method of claim 13, wherein the processing the at least one command comprises performing an action defined by the at least one command only after the at least one command is verified.

19. The method of claim 13, where the script and the BIOS code are stored together on a same serial peripheral interface (SPI) Flash memory device of the information handling system.

20. A method of booting an information handling system, comprising:
   detecting a script that comprises at least one command that modifies boot operation of the information handling system when performed;
   authenticating the script; and
   processing the at least one command during boot after the script is authenticated;
   wherein the processing the at least one command comprises arming the information handling system to monitor for a trigger event defined in the at least one command.

21. The method of claim 20, wherein the processing the at least one command further comprises performing a corresponding action defined in the at least one command when the trigger event is detected.

22. A method of booting an information handling system, comprising:
   detecting a script that comprises at least one command that modifies boot operation of the information handling system when performed;
   authenticating the script; and
   processing the at least one command during boot after the script is authenticated;
   wherein the processing the at least one command comprises arming the information handling system to monitor for a trigger event defined in the at least one command only when a system identifier matches a platform of the information handling system.

* * * * *